United States Patent [19]

Habib, Jr.

[11] 4,312,839
[45] Jan. 26, 1982

[54] PROCESS FOR CONTROLLING CALCIUM IN A LEACH OPERATION

[75] Inventor: E. Thomas Habib, Jr., Richardson, Tex.

[73] Assignee: Mobil Oil Corporation, New York, N.Y.

[21] Appl. No.: 31,258

[22] Filed: Apr. 18, 1979

[51] Int. Cl.$^3$ .............................................. C01G 43/00
[52] U.S. Cl. ......................................... 423/12; 423/7; 423/17; 423/18; 299/5
[58] Field of Search .......................... 423/18, 7, 12, 17; 299/5

[56] References Cited

U.S. PATENT DOCUMENTS

| | | | |
|---|---|---|---|
| 2,352,832 | 7/1944 | Gunderson | 166/21 |
| 2,806,764 | 9/1957 | Bailes et al. | 423/7 |
| 2,873,165 | 2/1959 | Bailes et al. | 423/18 |
| 3,205,013 | 9/1965 | Miller et al. | 299/5 |
| 3,792,903 | 2/1974 | Rhoades | 299/5 |
| 3,842,155 | 10/1974 | Muller et al. | 423/18 |
| 3,891,397 | 6/1975 | Fiedelman | 299/5 |
| 4,103,963 | 8/1978 | Espenscheid et al. | 299/4 |

Primary Examiner—Edward A. Miller
Attorney, Agent, or Firm—Charles A. Huggett; Michael G. Gilman; James F. Powers, Jr.

[57] ABSTRACT

A method for controlling calcium, e.g. calcite, build-up in the leach solution of a uranium and/or related values recovery operation wherein the leach solution is flowed through a value bearing ore to dissolve the desired values. A soluble fluoride, e.g. sodium fluoride, is added to the leach solution after it has passed through the ore to thereby precipitate calcium fluoride from the leach solution and lower the calcium content of the leach solution. The soluble fluoride may be added to the leach solution before the leach solution passes through the process equipment which is used to remove the values from the leach solution or the soluble fluoride may be added after the leach solution passes through the process equipment. If added before, it is preferable to also add a carbonate/bicarbonate solution along with the soluble fluoride to prevent coprecipitation of uranyl-/desired value fluoride or to redissolve coprecipitated fluoride back into the leach solution.

7 Claims, 1 Drawing Figure

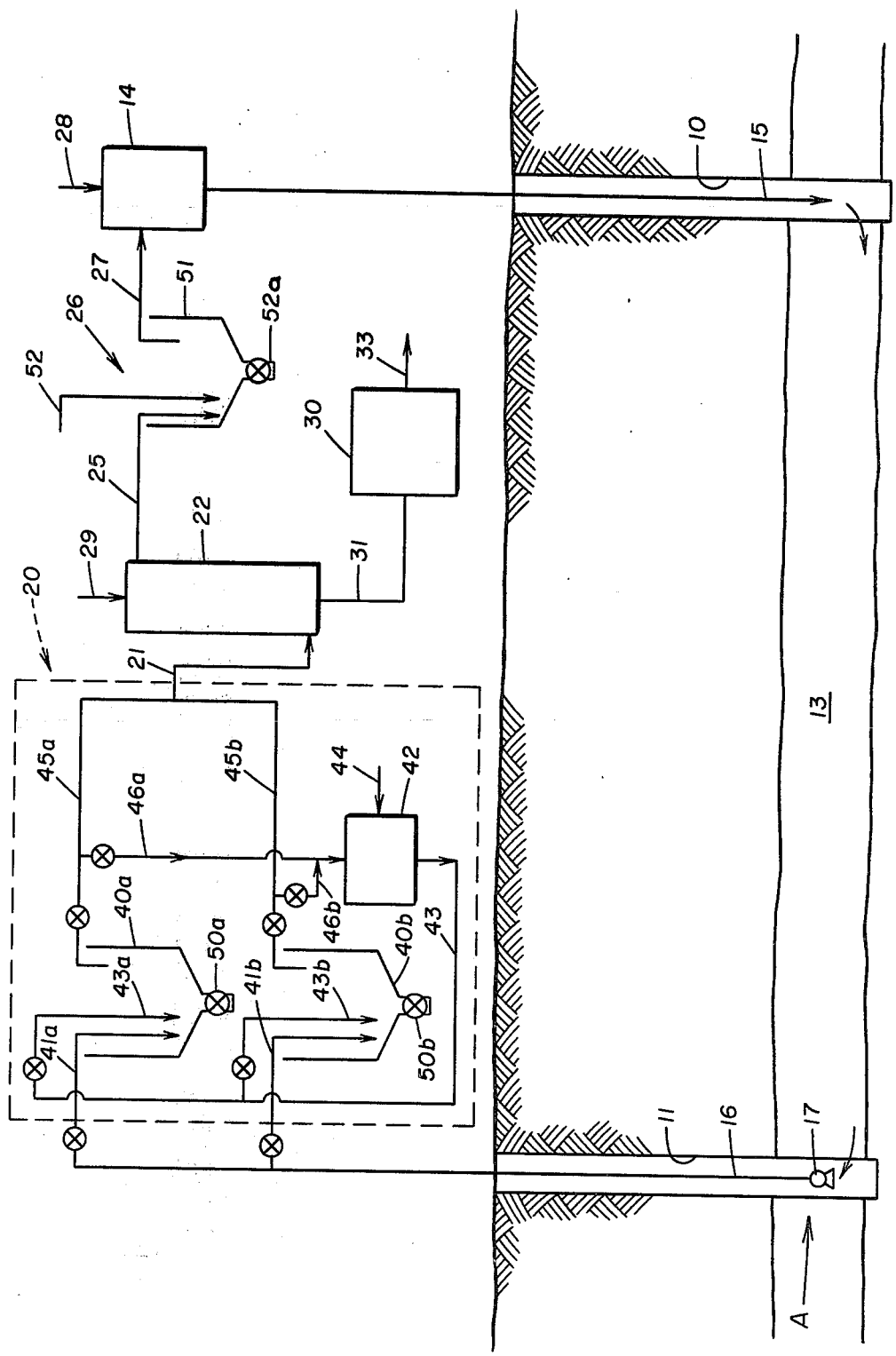

PROCESS FOR CONTROLLING CALCIUM IN A LEACH OPERATION

BACKGROUND OF THE INVENTION

The present invention relates to a method of controlling calcium, e.g. calcite in a uranium and/or related values, e.g., molybdenum, manganese, titanium, etc. recovery operation and more particularly relates to a method of controlling calcite build-up in the leach solution of an in situ leach operation by precipitating calcium from the leach solution after leach solution has been produced to the surface.

In a typical in situ leach operation for recovering uranium and/or related metal values, wells are completed into a mineral bearing ore formation and a leach solution is flowed between the walls. The uranium and/or related values are dissolved into the leach solution and are produced therewith to the surface where the pregnant leach solution is treated to recover the desired values.

In many of the known uranium and other mineral bearing formations, a substantial part of the formation matrix is comprised of calcium-based clays (e.g., smectite) and/or limestones. When certain leach solutions (e.g., carbonate and/or bicarbonate solutions) are used in these types of formations, the calcium clays and/or limestones react with the leach solutions to form substantial amounts of calcite (i.e., calcium carbonate) in the leach solutions which, if not properly controlled, will precipitate within the leaching circuit, thereby creating scaling and/or plugging problems throughout the operation.

Certain procedures are known for combating calcite build-up in the leaching circuit. For example, excess carbon dioxide ($CO_2$) can be added to the leach solution at various points in the leach circuit which aids in keeping the calcite in solution. However, it may be difficult to keep the $CO_2$ in solution since it easily vaporizes out of the leach solution at the pressures and temperatures normally existing in the leach circuit. Also, special equipment, such as calcite precipitators and/or commercially available water softeners can be used in the surface processing of the leach solution to physically and/or chemically remove calcite. Although complete removal of the calcite from the leach solution is most desirable, in many known leach operations the total removal of calcite from the leach solution with such equipment would be extremely expensive and would seriously affect the overall success of a commercial leach operation. Accordingly, there is normally some calcite still present in the leach solution even after treatment with such equipment, and this calcite can foul the extraction means used for extracting the uranium and/or related values from the leach solution. Also, since the barren leach solution may be used to make fresh leach solution, calcite in barren leach solution may precipitate in the mixing tanks and/or the injection wells.

Further, as is known, certain chemicals commonly called "inhibitors" can be added to a solution to prevent scale build-up due to calcite precipitation. However, the indiscriminate use of such inhibitors in an in situ leaching cycle where the leach solution is to be reused may be detrimental since normal amounts of inhibitors tend to stabilize the calcite in the leach solution, causing the calcite to build up in the recycled leach solution to levels which may threaten the overall leach operation. Also, selective use of inhibitors has been proposed to keep the calcite in solution for a specified time after which it can be precipitated out of solution at designated points in the leach circuit, see U.S. Pat. No. 4,103,963.

SUMMARY OF THE INVENTION

The present invention provides a method for controlling the build-up of calcium, e.g. calcite in a leach circuit of a uranium and/or related values recovery operation by precipitating calcium from the leach solution at selected points in the circuit.

In accordance with the present invention, a soluble fluoride (e.g. sodium fluoride) is added to the leach solution which lowers the calcium concentration therein by precipitating out calcium fluoride ($CaF_2$). This insoluble $CaF_2$ can then be removed from the leach circuit by filtering, settling, or by use of a calcium precipitator such as a "Spiractor Precipitator", manufactured by Permutit Company, Paramus, N.J.

The soluble fluoride may be added to the pregnant leach solution before it passes through the uranium or related values extraction means and/or the soluble fluoride can be added to the barren leach solution after the desired values have been removed but before the barren leach solution is used to make up fresh leach solution for recycle.

Where the soluble fluoride is added to the pregnant leach solution, additional steps are taken since some desired values, e.g. uranium, in the leach solution will be initially co-precipitated with the calcium. One such step includes adding a carbonate/bicarbonate solution (e.g. sodium bicarbonate) to the leach solution along with the soluble fluoride. This keeps a substantial amount of the desired value in solution while having no effect on the precipitation of $CaF_2$. Further, in the preferred embodiment, the soluble fluoride and the carbonate/bicarbonate solution are added to the leach solution in a holding/settling tank. The fluoride precipitate of the desired value, e.g. uranyl fluoride, is highly water soluble so that almost all of the desired value co-precipitate will redissolve into the leach solution within the holding/settling tank after an equilibrium condition is obtained. Also, the precipitate $CaF_2$ can easily be washed with water and/or a carbonate/bicarbonate solution to recover additional amounts of the desired value, if commercial considerations so dictate.

BRIEF DESCRIPTION OF THE DRAWING

The actual operation and the apparent advantages of the invention will be better understood by referring to the drawing in which:

The FIGURE is a schematical view of an in situ leaching circuit in accordance with the present invention.

DESCRIPTION OF THE PREFERRED EMBODIMENT

Referring more particularly to the drawing, the figure discloses a simplified schematic view of the present invention as it is applied in a typical in situ leach circuit. At least one injection well 10 and at least production well 11 are completed into a uranium and/or related values ore bearing formation 13. Formation 13 is of a common type having large amounts of calcium compounds therein, e.g., calcium-based clays and/or limestones. A leach solution e.g., a carbonate and/or bicarbonate solution, is prepared in a make-up area, e.g., mixing tank 14, and is injected into formation 13 through line 15 in injection well 10. As is known in the art, where uranium is present, it usually occurs in such formations in its reduced tetravalent state and must be oxidized to its hexavalent state in order to make the uranium values soluble in the leach solution. To accomplish this, an oxidant (e.g., hydrogen peroxide, air, $O_2$, etc.) is normally injected into formation 13 along with the leach solution.

The leach solution and oxidant flow through formation 13 from injection well 10 to production well 11. The uranium values are oxidized to $UO_2^{++}$ which forms a chemical complex with the carbonate in the leach solution e.g., uranyl tricarbonate ion. This ion, in turn, dissolves into the leach solution (which is now referred to as pregnant leach solution). Unfortunately, calcium is also leached from the formation, and this calcium reacts with carbonate in the leach solution to form calcite (calcium carbonate) which is carried by the pregnant leach solution to production well 11. The pregnant leach solution and the calcite therein is produced through line 16 by means of submersible pump 17 or the like to the surface for processing.

The pregnant leach solution flows through line 16 through a calcium removal means 20 (which will be described in detail below) to substantially reduce the calcium in the leach solution to uranium and/or desired values extraction means 22 (e.g., ion exchange resin column). The barren leach solution, now stripped of the desired values, passes from means 22 through line 25 through a second calcium removal means 26, and on to mixing tank 14 through line 27 where desired amounts of those chemicals being used to form the leaching solution e.g., carbon dioxide and oxidant, are added through line 28 to the barren leach solution to bring it back up to strength for recycling in the leach circuit. The desired values are removed from extraction means 22 by passing an eluant from line 29, through means 22, and to recovery means 30 via line 31 wherein the uranium product (e.g., "yellowcake") or other values are separated from the eluant and passed to storage or the like via line 33.

Now that the overall leach operation has been described, a more detailed description of the calcium removal means 20, 26, respectively, will be set forth. Calcium removal means 20, as illustrated, is preferably comprised of at least two holding/settling tanks 40a, 40b, only one of which is in use at a time. Pregnant leach solution flows from line 16, through line 41a, into tank 40a near the bottom thereof while the proper valves (unnumbered) are closed to tank 40b. The soluble fluoride of the present invention is preferably in solution in mixing tank 42 and is supplied to lowerpart of tank 40a by means of lines 43, 43a. The soluble fluoride solution is preferably 0.5 M solution of sodium fluoride (NaF) which can be formed by mixing NaF and water or by mixing hydrogen fluoride with sodium hydroxide. Other soluble fluorides include hydrogen fluoride, per se, and mixtures of hydrogen fluoride, sodium fluoride, and sodium hydroxide. Also, the alkali metal fluorides other than sodium can be used but are more expensive than sodium fluoride. Likewise, ammonium fluoride can be used but may not be as ecologically sound as sodium. Still further, it has been found that alkali metal oxalates, e.g. $Na_2C_2O_4$, will precipitate calcium as calcium oxalate ($CaC_2O_4$) but cost normally rules out the use of these oxalate compounds.

Since the soluble fluoride solution is being mixed with pregnant leach solution, the desired value, e.g. uranium, in the leach solution will normally co-precipitate with the $CaF_2$. In the present invention, it is preferred to add sodium bicarbonate ($NaHCO_3$) through line 44 to the soluble fluoride solution in tank 42 whereby the solution flowing from tank 42 will have a composition of 0.2 M $NaHCO_3$. The $NaHCO_3$ solution aids in keeping the uranium values in solution by redissolving the uranyl fluoride as it starts to form. Also, it will redissolve the uranyl fluoride from the settled $CaF_2$ on the bottom of tank 40a.

It should be understood that some loss in uranium content of the pregnant leach solution may be experienced as a holding/settling tank 40a is brought on stream due to the co-precipitation of uranyl fluoride with $CaF_2$. However, by mixing the pregnant leach solution and the soluble fluoride solution near the bottom of tank 40a and by withdrawing the treated leach solution from the top of tank 40a through line 45a, an equilibrium between the precipitating uranyl fluoride and redissolving uranyl fluoride will be reached whereby the loss of uranium content in the pregnant leach solution will be minimized.

If desirable, a small portion of the treated pregnant leach solution may be used to make up the fluoride solution by flowing a small stream of leach solution from line 45a, through line 46a, and into mixing tank 42 where sodium fluoride and sodium bicarbonate is added thereto.

When tank 40a is filled to a determined level with $CaF_2$, the proper valves (unnumbered) are manipulated to cease flow to tank 40a and to redirect the flow to tank 40b where the above described operation is repeated. If desired, the $CaF_2$ in tank 40a can then be washed with water and/or a carbonate-bicarbonate solution to recover additional amounts of uranyl fluoride that may be present before the $CaF_2$ is removed from tank 40a through dump 50a for disposal. Alternately, the $CaF_2$ can be removed from tank 40a and washed in a separate facility.

Calcium removal means 26 is also preferably comprised of two or more holding/settling tanks 51 (only one shown) which operates in the same manner as do tanks 40a, 40b. The barren leach solution (now stripped of most of the desired values) flows into the bottom of tank 51 where it is mixed with the soluble fluoride solution being supplied through line 52. The treated barren leach solution is drawn from the top of tank 51 through line 27 while the precipitated $CaF_2$ settles to the bottom of tank 51 where it can be removed through dump 52a. Since there should be little, if any, uranyl fluoride in tank 51, no sodium bicarbonate needs to be added with the soluble fluoride solution at this point. Likewise, normally the $CaF_2$ in tank 51 will not need to be washed unless the particular situation dictates.

To further illustrate the present invention, the following examples and data are set forth. Six experiments of varying conditions were run. Each experiment was conducted in a 250 ml Erlenmeyer flask, and all samples were filtered prior to analysis for calcium and uranium. In Experiment I, NaF solution (0.5 M) was added very rapidly (in stages) to 200 cc of commercial uranium leach pilot plant pregnant leachate. In the Experiment 2, NaF solution (0.5 M) was added to 200 cc of pregnant leachate, but this time it was added slowly—over a period of four hours. Also, in Experiment 2, 10 g. of pure powdered $CaF_2$ was added to the pregnant leachate prior to addition of the NaF. The powdered CaF$_2$ functioned as seed crystals to promote the precipitation of calcium as CaF$_2$.

Experiments 3, 4, and 5, each utilized 100 cc of pregnant leachate from a similar commercial leach operation. This leachate was considerably richer in uranium, and therefore, constituted a more stringent test concerning the uranium co-precipitation problem. Experiment 3 was conducted at 50° C. and in Experiment 4, solid NaF was used. In Experiment 5, the 0.5 M NaF solution used also contained 0.2 M NaHCO$_3$. Experiment 6 utilized 100 cc of a synthetic barren leachate. The results are summarized in the following tables.

EXPERIMENT I (RAPID ADDITION)

Base Leachate: 304 ppm Ca and 75 ppm U$_3$O$_8$ (200 cc used)

| cc of 0.5 M NaF added | ppm Ca | ppm U$_3$O$_8$ |
|---|---|---|
| 2 | 118 | 32 |
| 5 | 11.2 | 13 |
| 10 | 0.35 | 21 |

EXPERIMENT 2 (SLOW ADDITION)

Base Leachate: 304 ppm Ca and 75 ppm U$_3$O$_8$ (200 cc used)

| cc of 0.5M NaF added | ppm Ca | ppm U$_3$O$_8$ |
|---|---|---|
| 6 | 23.1 | 29 |
| 10 | 0.90 | 16 |
| 13 | 0.27 | 19 |
| 20 | 0.10 | 21 |

EXPERIMENT 3

100 cc of Pregnant Leachate 0.5 M NaF Solution 50° C.

| Time, hrs. | (cumulative) cc added | ppm Ca | ppm U$_3$O$_8$ |
|---|---|---|---|
| Base Leachate | | 262 | 369 |
| 0 | 2.0 | — | — |
| 0.3 | — | 92 | 269 |
| 0.4 | 4.0 | — | — |
| 0.6 | — | 12 | 254 |

EXPERIMENT 4

100 cc of Pregnant Leachate 100 mg of Solid NaF Added

| | ppm Ca | ppm U$_3$O$_8$ |
|---|---|---|
| Base Leachate | 262 | 369 |
| After 20.3 hrs. | 9 | 292 |

EXPERIMENT 5

100 cc of Pregnant Leachate 0.5 M NaF, 0.2 M NaHCO$_3$ Solution

| time, hrs | (cumulative) cc added | ppm Ca | ppm U$_3$O$_8$ |
|---|---|---|---|
| Base Leachate | | 262 | 369 |
| 0 | 1.5 | — | — |
| 0.3 | — | 126 | 305 |
| 0.4 | 3.0 | — | — |
| 20.3 | — | 29 | 360 |
| 20.4 | 4.0 | — | — |
| 20.7 | — | 11 | 329 |

EXPERIMENT 6

100 cc of Barren Leachate 0.5 M NaF Solution

| time, hours | (cumulative) cc added | ppm Ca | ppm U$_3$O$_8$ |
|---|---|---|---|
| Base Leachate | | 257 | 6 |
| 0 | 2.0 | — | — |
| 0.2 | — | 62 | 0 |
| 0.3 | 2.0 | — | — |
| 0.5 | — | 6 | 9* |

*Experimental error

All of the experiments showed excellent calcium removal when fluoride was added. Experiments 1 and 2 demonstrated that severe loss of uranium values can occur by co-precipitation with the CaF$_2$. This problem occurred whether the NaF was added rapidly (Experiment 1) or slowly (Experiment 2).

Experiments 3 and 4 showed that co-precipitation of uranium still occurred whether the precipitation took place at 50° C. (Experiment 3) or if the NaF was added as a solid (Experiment 4).

The co-precipitation problem was overcome in Experiment 5. Here the 0.5 M NaF solution used also contained 0.2 M NaHCO$_3$. Co-precipitation of uranium was greatly reduced, and the small amount of co-precipitated uranium redissolved within about 20 hours. (Note that in Experiment 4, a significant amount of uranium remained precipitated after 20 hours).

Experiment 6 showed that calcium can be removed from barren leachate by adding fluoride. Since there is little uranium in barren leachate, there can be little loss by co-precipitation.

What is claimed is:

1. In a leach operation wherein a leach solution is flowed through a calcium-based, uranium bearing ore to dissolve the uranium values from said ore and to carry said values to uranium recovery means wherein said uranium values are recovered from said leach solution, the method of controlling the calcium content of the leach solution comprising:

mixing a soluble fluoride with said leach solution after it has passed through said ore but before said leach solution is flowed through said uranium removal means;

precipitating calcium fluoride from said leach solution; and removing said calcium fluoride precipitate from said leach solution.

2. The method of claim 1 wherein said soluble fluoride is also mixed with said leach solution after said leach solution is flowed through said uranium recovery means.

3. The method of claim 1 wherein said soluble fluoride comprises sodium fluoride.

4. The method of claim 1 wherein said soluble fluoride comprises hydrogen fluoride.

5. The method of claim 1 wherein said soluble fluoride comprises 0.5 M solution of sodium fluoride.

6. The method of claim 1 including:
mixing a carbonate/bicarbonate solution with said soluble fluoride and said leach solution to redissolve uranyl fluoride that coprecipitates with said calcium fluoride.

7. The method of claim 1 including:
treating said calcium fluoride after it has been removed from said leach solution to recover uranyl fluoride which coprecipitated with said calcium fluoride.

* * * * *